United States Patent [19]

Osborne

[11] Patent Number: 5,007,962
[45] Date of Patent: Apr. 16, 1991

[54] BORON NITRIDE COATINGS

[75] Inventor: Timothy W. Osborne, Brooklyn, Ohio

[73] Assignee: Union Carbide Corporation, Danbury, Conn.

[21] Appl. No.: 409,057

[22] Filed: Sep. 19, 1989

[51] Int. Cl.$^5$ .......................... C04B 35/68; B28B 7/38
[52] U.S. Cl. ................................ 106/38.22; 252/305; 106/311; 106/403
[58] Field of Search ...................... 252/305, 12, 15, 25; 106/311, 403, 38.22

[56] References Cited

U.S. PATENT DOCUMENTS

| 3,291,622 | 12/1966 | Mandorf et al. | 501/96 |
| 3,577,245 | 5/1971 | Quandt | 501/96 |
| 3,773,683 | 11/1973 | Aubert | 252/305 |
| 4,202,523 | 5/1980 | Radtke | 252/25 |
| 4,233,077 | 11/1980 | Hazel | 501/88 |
| 4,238,433 | 12/1980 | Hillig | 264/60 |

OTHER PUBLICATIONS

CERAC, Incorporated, Milwaukee, WI, "Material Safety Data Sheet" Standard Oil Engineered Materials Company, Sanborn, N.Y., Material Safety Data Sheet. Sintec Keramik GmbH, Romantische Strabe 18 D--Buching, "Material Safety Data Sheet".

Primary Examiner—Mark L. Bell
Attorney, Agent, or Firm—Cornelius F. O'Brien

[57] ABSTRACT

A boron nitride-containing composition for use as a film-forming coating on substrates comprising particulate boron nitride dispersed in a solution of methyl chloroform and a solvent, with or without clay. The composition is also suitable for use in aerosol cans.

16 Claims, No Drawings

BORON NITRIDE COATINGS

FIELD OF THE INVENTION

The present invention relates to a boron nitride-containing composition for use as a film-forming coating on various substrates. The composition comprises particulate boron nitride dispersed in a vehicle-binder solution comprising methyl chloroform and a solvent with or without clay.

BACKGROUND OF THE INVENTION

Boron nitride has been used extensively as vaporization vessels (also known as vaporization boats) for various compositions. In addition to the use of solid boron nitride articles, such as vaporization vessels, boron nitride powders have found use in many applications such as coatings for high temperature molds to facilitate release of glass, metals, ceramics or the like. Boron nitride coatings can also be used as antisputter coatings for welding applications; anticorrosive coatings for various substrates; and thermally conductive/electrically insulating coatings for electronic equipment. Although boron nitride powders can be dispersed in a liquid medium and then applied to a surface of a substrate, it is difficult to provide a solution of dispersed particulate boron nitride that will yield a boron nitride coating having excellent adherence to the substrate.

It is an object of the present invention to provide a boron nitride-containing composition that when applied to a surface of a substrate will produce a boron nitride coating having a high temperature adherence to the substrate.

It is another object of the present invention to provide a boron nitride-containing composition comprising particulate boron nitride dispersed in methyl chloroform and a solvent.

It is another object of the present invention to provide a boron nitride-containing composition comprising particulate boron nitride dispensed in methyl chloroform and a solvent with or without clay.

It is another object of the present invention to provide a boron nitride-containing composition comprising particulate boron nitride in combination with particulate clay, aluminum nitride, titanium diboride ($TiB_2$) and/or boron carbide ($B_4C$) dispersed in methyl chloroform and a solvent.

Additional objects of the invention will become evident in the description that follows.

SUMMARY OF THE INVENTION

The invention relates to a boron nitride-containing composition for use as a film-forming coating on substrates, said composition comprising particulate boron nitride dispersed in a vehicle-binder solution of methyl chloroform and a solvent such as an alcohol.

Boron nitride powders usually contain a minor amount of $B_2O_3$ and although not bound by theory, it is believed that $B_2O_3$ gets dissolved in the alcohol (solvent), reacts with the methyl chloroform and together with the dispersed boron nitride powders can be deposited on a substrate to produce a boron nitride high temperature adhered coating.

The particulate boron nitride for use in this invention could be sized from 0.1 micron to 50 microns, preferably from 0.5 micron to 30 microns and most preferably from 5 microns to 15 microns. For use in aerosol cans, the particulate boron nitride most preferably should be sized from 6 microns to 12 microns. The particulate boron nitride powders generally contain a minor amount of $B_2O_3$ and for most applications the amount of $B_2O_3$ should be at least about 0.05 weight percent, preferably about 0.15 weight percent based on the weight of methyl chloroform. In addition to boron nitride powders. Powders of aluminum nitride, titanium diboride, boron carbide and mixtures thereof could also be used with the boron nitride powders to produce a boron nitride coating having specific characteristics. For example, titanium diboride can be added to increase electrical conductivity while aluminum nitride can be added to increase thermal conductivity of the coating. In most applications, the additional powders should be sized similarly to the boron nitride.

Methyl chloroform is a liquid in which the particulate powders are suspended. In most applications, clay may also be used in conjunction with methyl chloroform as a suspension agent. Clay generally comprises particles of hydrous aluminum silicates and, depending where obtained, other minerals. When using clay as an additional component, it may be present in an amount from 1 to 60 weight percent, preferably 10 to 50 weight percent and most preferably 25 to 45 weight percent, based on the weight of the solid components of the composition. As stated above, it is believed that methyl chloroform reacts with the $B_2O_3$ normally contained in the boron nitride powders. In addition, it is believed that a minor amount of a solvent, such as alcohol, may be necessary to dissolve the $B_2O_3$ so that the $B_2O_3$ can be readily reacted with the methyl chloroform. This unique combination when applied to a substrate as a coating will produce an adhered polishable coating of boron nitride that is handleable and resists chipping. In some applications, the coating can be buffed to produce a highly polished surface. In addition, the coating exhibits good high temperature bonding strengths thus enabling the coated substrate to be used in many high temperature environments.

The term "solvent" is intended to mean any water-miscible solvent. Preferably, the solvent may be an alcohol such as ethanol as well as methanol, isopropanol and n-propanol. Other suitable water-miscible solvents are, for example, acetone, dioxane, ethylene glycol, glycerin, ethylene glycol monoethyl ether, dimethylformamide, and the like. The preferred solvents for use in this invention are methanol and ethanol.

In most applications the boron nitride-containing composition of this invention will contain from 1.5 to 50 weight percent particulate boron nitride, from 10 to 70 weight percent methyl chloroform and from 5 to 30 weight percent solvent. Preferably, for use in aerosol cans, the particulate boron nitride would be 1.5 to 6 weight percent, methyl chloroform would be 10 to 70 weight percent and alcohol would be 5 to 20 weight percent. An amount of particulate boron nitride below 1.5 weight percent would not produce an effective boron nitride coating while an amount above 6 weight percent could not be effectively sprayed from aerosol cans. The amount of methyl chloroform should be sufficient to react with $B_2O_3$ to form a film of boron nitride that would adhere to a substrate. The minimum amount of solvent required is that which is necessary to dissolve the $B_2O_3$ from the boron nitride powders. All percentages are weight percentages based on the total composition.

If additional powders are added then the amount should be sufficient to obtain the particular characteristics desired in the end product. For example, particulate aluminum nitride could be added in an amount from 1 to 48 weight percent to increase thermal conductivity of the coating while particulate titanium diboride could be added in an amount from 1 to 48 weight percent to increase electrical conductivity of the coating.

The boron nitride-containing composition of this invention could be brush painted or sprayed on a substrate to produce an adhered boron nitride coating. The boron nitride-containing composition of this invention could also be used in an aerosol can with a conventional propellant gas such as isobutane. In this embodiment, the novel boron nitride-containing composition could be dispersed from the aerosol can directly onto the surface of a substrate to produce an adhered coating of boron nitride that will remain on the substrate when exposed to high temperature conditions. Any suitable propellant gas used in aerosol cans could be employed with the boron nitride-containing composition of this invention. For example, suitable propellant gases are isobutane, carbon dioxide and propane and mixtures thereof and can be present in an amount of at least 30, preferably between 30 and 40, weight percent based on the weight of the composition.

The boron nitride-containing composition of this invention could be dispersed on any type or shape of substrate where a boron nitride coating would be desirous. For example, the boron nitride-containing composition of the invention is ideally suited to coat such substrates as graphite, paper, metal, ceramics, and the like.

EXAMPLE 1

Using conventional techniques a composition was formulated of the components listed below and fed into an aerosol can.

| | |
|---|---|
| Methyl Chloroform | 50 weight percent |
| Ethanol | 6 weight percent |
| Methanol | 4 weight percent |
| *Boron Nitride Powders | 3 weight percent |
| ProPellant gas-isobutane | 37 weight percent |

*sized 7 to 10 microns and contained about 0.5 weight Percent $B_2O_3$.

The composition was sprayed from the aerosol can onto a surface of graphite until a layer of about 0.010 inch thick was produced. The solvents in the dispersed composition evaporated leaving a coating of boron nitride on the substrate.

EXAMPLE 2

Using conventional techniques a composition was formulated of the components listed below and fed into an aerosol can.

| | |
|---|---|
| Methyl Chloroform | 49.725 weight percent |
| *Clay | 2.275 weight percent |
| Ethanol | 5.850 weight percent |
| Methanol | 3.900 weight percent |
| **Boron Nitride Powders | 3.250 weight percent |
| ProPellant gas-proPane and isobutane | 35.000 weight percent |

*clay was obtained commercially from NL Chemicals. Inc. under its trademark Bentone 34 for an organo/clay (tetraalkyl ammonium bentonite).
**sized 7 to 10 microns and contained about 0.5 weight percent $B_2O_3$.

The composition was sprayed from the aerosol can onto a surface of graphite until a layer of about 0.010 inch thick was produced. The solvents in the dispersed composition evaporated leaving a coating of boron nitride secured to the substrate. The overall coating had a relatively hard surface.

EXAMPLE 3

Using conventional techniques a composition was formulated of the components listed below and fed into an aerosol can.

| | |
|---|---|
| Methyl Chloroform | 50.00 weight percent |
| *Clay | 2.47 weight percent |
| Ethanol | 5.8 weight percent |
| Methanol | 3.47 weight percent |
| **Boron Nitride Powders | 3.25 weight percent |
| Propellant gas-isobutane | 35.00 weight percent |

*clay was obtained commercially from NL Chemicals. Inc. under its trademark Bentone 34 for an organo/clay (tetraalkyl ammonium bentonite).
**sized 7 to 10 microns and contained about 0.5 weight percent $B_2O_3$.

The composition was sprayed from the aerosol can onto a surface of graphite until a layer of about 0.01 inch thick was produced. The solvents in the dispersed composition evaporated leaving a coating of boron nitride secured to the substrate. The overall coating had a relatively hard surface.

While in the foregoing specification a detailed description of specific embodiments of the invention was set forth for the purpose of illustration, it is to be understood that many of the details herein given may be varied considerably by those skilled in the art without departing from the spirit and scope of the invention.

What is claimed:

1. A boron nitride-containing composition for use as a film-forming coating comprising particulate boron nitride containing $B_2O_3$ dispersed in a solution of methyl chloroform and at least one solvent and wherein said particulate boron nitride containing $B_2O_3$ is from 1.5 to 50 weight percent, said methyl chloroform is from 10 to 70 weight percent and said solvent is from 5 to 30 weight percent, all based on the weight of the composition and wherein said particulate boron nitride is sized from 0.1 to 50 microns.

2. The boron nitride-containing composition of claim 1 wherein said particulate boron nitride containing $B_2O_3$ is from 1.5 to 6 weight percent.

3. The boron nitride-containing composition of claim 1 wherein said solvent is selected from the group consisting of ethanol, methanol, isopropanol, n-propanol, acetone, dioxane, ethylene glycol, glycerin, ethylene glycol monoethyl ether and dimethylformamide.

4. The boron nitride-containing composition of claim 1 wherein said composition contains clay.

5. The boron nitride-containing composition of claim 4 wherein said clay is present in an amount from 1 to 60 weight percent based on the weight of the solid components of the composition.

6. The boron nitride-containing composition of claim 5 wherein said clay is present in an amount from 10 to 50 weight percent based on the weight of the solid components of the composition.

7. The boron nitride-containing composition of claim 6 wherein said solvent is an alcohol selected from the group consisting of ethanol and methanol.

8. The boron nitride-containing composition of claim 1 further comprising a propellant gas and said composition and propellant gas assembled in an aerosol spray can.

9. The boron nitride-containing composition of claim 4 further comprising a propellant gas and said composition and propellant gas assembled in an aerosol spray can.

10. The boron nitride-containing composition of claim 8 or 9 wherein said propellant gas is selected from the group consisting of isobutane, carbon dioxide and propane and mixtures thereof.

11. The boron nitride-containing composition of claim 10 wherein the propellant gas is present in an amount of at least 30 weight percent based on the weight of the composition.

12. The boron nitride-containing composition of claim 11 wherein said particulate boron nitride containing $B_2O_3$ is from about 1.5 to 6 weight percent, said methyl chloroform is from about 10 to 70 weight percent, said solvent is from about 5 to 20 weight percent and said propellant gas is from about 30 to 40 weight percent based on the weight of the composition.

13. The boron nitride-containing composition of claim 1 wherein particulate aluminum nitride is added to the composition.

14. The boron nitride-containing composition of claim 4 wherein particulate aluminum nitride is added to the composition.

15. The boron nitride-containing composition of claim 1 wherein particulate titanium diboride is added to the composition.

16. The boron nitride-containing composition of claim 4 wherein particulate titanium diboride is added to the composition.

* * * * *